United States Patent [19]

Nakaya et al.

[11] Patent Number: 4,521,397

[45] Date of Patent: Jun. 4, 1985

[54] PROCESS FOR PRODUCING CALCIUM HYPOCHLORITE HYDRATE CRYSTALS

[75] Inventors: Keiichi Nakaya, Chiba; Kunio Sato, Ichihara, both of Japan

[73] Assignee: Asahi Glass Company, Ltd., Tokyo, Japan

[21] Appl. No.: 515,547

[22] Filed: Jul. 20, 1983

[30] Foreign Application Priority Data

Aug. 4, 1982 [JP] Japan ................................. 57-135133

[51] Int. Cl.³ .............................................. C01B 11/04
[52] U.S. Cl. ..................................... 423/474; 423/158
[58] Field of Search ................................ 423/474, 158

[56] References Cited

U.S. PATENT DOCUMENTS

| | | | |
|---|---|---|---|
| 934,467 | 9/1909 | Schultze | 423/474 |
| 1,937,230 | 11/1933 | Kitchen | 423/474 |
| 2,007,429 | 7/1935 | Klopstock | 423/474 |
| 2,368,042 | 1/1945 | Robson | 423/474 |
| 3,440,024 | 4/1969 | Faust et al. | 423/474 |
| 3,760,064 | 9/1973 | Droste | 423/474 |

FOREIGN PATENT DOCUMENTS 487009 6/1938 United Kingdom ............... 423/474

*Primary Examiner*—William R. Dixon, Jr.
*Assistant Examiner*—Steven Capella
*Attorney, Agent, or Firm*—Oblon, Fisher, Spivak, McClelland & Maier

[57] ABSTRACT

A process for producing calcium hypochlorite hydrate crystals, which comprises continuously supplying a basic calcium hypochlorite slurry and chlorine gas, and reacting them at a temperature of from 20°–50° C. and at a chlorination rate of from 92 to 98.5% to precipitate calcium hypochlorite crystals at a crystallization velocity of not greater than 200 kg/m³ per hour.

10 Claims, No Drawings

PROCESS FOR PRODUCING CALCIUM HYPOCHLORITE HYDRATE CRYSTALS

FIELD OF THE INVENTION

The present invention relates to a process for producing calcium hypochlorite, and particularly to a process for continuously producing calcium hypochlorite in a stabilized fashion with good separability from the mother liquor.

DESCRIPTION OF THE PRIOR ART

Calcium hypochlorite is widely used as an active ingredient for highly effective bleaching powders and is important as an inexpensive agent for sterilization, disinfection or bleaching.

As a basic method for the preparation of a neutral hydrate of calcium hypochlorite, it is known to chlorinate calcium hydroxide. However, according to this method, the crystals thereby formed are usually very fine, and accordingly it is difficult to separate the crystals from the mother liquor. Further, as the chlorination rate is increased, the viscosity of the reaction system tends to be extremely high, whereby an industrial production becomes difficult. In order to avoid the trouble of the increase of the viscosity, a method is commonly employed wherein sodium hydroxide is present in the reaction system. In another method, crystals of calcium hypochlorite hydrate is obtained by the evaporation and concentration of a relatively dilute aqueous solution of calcium hypochlorite.

However, the former method requires expensive sodium hydroxide, and the latter method has drawbacks such that it requires considerable heat energy for the evaporation and high installation costs. Further, in these conventional methods, the precipitated calcium hypochlorite hydrate crystals are very fine, whereby the subsequent solid-liquid separation tends to be inefficient.

The present inventors have conducted various researches with an aim to develop an industrial process for continuously producing calcium hypochlorite (which used to be difficult with the conventional methods) in a stabilized fashion without leading to a high viscosity of the reaction system (which used to be a drawback of the conventional methods), whereby the particles formed have good separability from the mother liquor, and, as a result, have found that when a basic calcium hypochlorite and chlorine are continuously supplied to the reaction system and reacted while maintaining the chlorination rate within a certain specific range, the reaction system will not have a high viscosity, and that when the crystallization velocity of the calcium hypochlorite hydrate crystals is controlled within a certain specific range by adjusting the amounts of supply of these starting materials, the crystals of the calcium hypochlorite hydrate thereby precipitated have a large crystal size, whereby it is possible to conduct the separation of the crystals from the mother liquor very efficiently. The present invention has been accomplished on the basis of these discoveries.

SUMMARY OF THE INVENTION

Thus, the present invention provides a process for producing calcium hypochlorite, which comprises continuously supplying a basic calcium hypochlorite slurry and chlorine gas, and reacting them at a temperature of the reaction system of from 20° to 50° C. at a chlorination rate of from 92 to 98.5% to precipitate calcium hypochlorite at a crystallization velocity of not greater than 200 kg/m$^3$.hr.

When the chlorination is conducted by a batch method, transition takes place in the reaction system during the process of the chlorination reaction, and the reaction system becomes to have a high viscosity.

DESCRIPTION OF THE PREFERRED EMBODIMENTS

Whereas, according to the present invention, the chlorination rate in the reactor is always maintained at a level of from 92 to 98.5%, whereby the reaction system does not become highly viscous.

If the chlorination rate is less than 92%, the viscosity of the reaction system tends to increase substantially, and it becomes difficult to adequately uniformly distribute the supplied chlorine, whereby side reactions are likely to take place due to the excessive chlorination, the cooling operation tends to be difficult or, when the chlorination rate is extremely low, decomposition is likely to be led or crystals which adversely affect the filtrability are likely to form. Such undesirable phenomena are likely to occur also when the chlorination rate exceeds 98.5%.

Within the above mentioned range of the chlorination rate, it is particularly preferred to employ a chlorination rate of from 96 to 98%, since it is thereby possible to maintain the viscosity of the reaction system at a low level and to continuously conduct a constant operation. The control of the chlorination rate may be carried out by a combination of various conditions which will be described hereinafter. However, if necessary, the chlorination rate may also be controlled by measuring the oxidation-reduction potential.

Further, in the present invention, the pH of the reaction system can be another condition required for the continuous operation. If the pH is too low or too high, it is likely to affect the viscosity of the reaction system, or under certain conditions, it is likely that products other than the desired product tend to form. The pH range is determined depending upon the temperature of the reaction system and other conditions. For instance, at a temperature of 40° C., the above mentioned adverse effects may be avoided by employing a pH of from 9.0 to 9.8, preferably from 9.1 to 9.5.

In the present invention, when the temperature of the reaction system during the reaction is lower than 20° C., fine crystals tend to form which are hardly separable from the mother liquor. On the other hand, if the temperature exceeds 50° C., by-products other than the desired product are likely to form.

Within the above mentioned temperature range, it is particularly preferred to employ a temperature of from 30° to 40° C., since no special cooling is thereby required, and it is thereby possible to constantly obtan crystals having a uniform size and particle diameter.

Another feature of the present invention is that the crystallization velocity of the calcium hypochlorite hydrate crystals in the reactor is controlled to be not greater than 200 kg/m$^3$.hr. If the crystallization velocity is greater than 200 kg/m$^3$.hr, the size of the precipitating calcium hypochlorite hydrate crystals tend to be small, whereby the subsequent separation operation will be inefficient. The crystallization velocity is preferably not greater than 150 kg/m$^3$.hr, more preferably not greater than 120 kg/m$^3$.hr.

The lower limit of the crystallization velocity is not so critical. However, if it is too small, the reaction volume wil have to be enlarged, such being undesirable for an industrial operation. Therefore, the crystallization velocity is preferably at least 5 kg/m$^3$.hr, more preferably at least 30 kg/m$^3$.hr, particularly at least 50 kg/m$^3$.hr.

Further, the slurry concentration in the reaction system is likely to be a factor affecting the filtration separability of the calcium hypochlorite. Accordingly, in the present invention, the slurry concentration in the reaction system is preferably from 5 to 35% by weight, more preferably from 15 to 25% by weight. If the slurry concentration is less than 5% by weight, the liquid volume to be treated will be too large to conduct the operation advantageously. On the other hand, if the slurry concentration is greater than 30% by weight, the viscosity of the liquid tends to be too high.

Furthermore, the concentration of the calcium chloride formed in the reactor will also affect the crystal size of the resulting calcium hypochlorite and the filtrability of the crystals. The calcium chloride concentration is determined depending upon the temperature of the reaction system and other conditions. For instance, at a temperature of 40° C., the concentration is preferably at most 18%.

There is no particular restriction to the method for preparing the basic calcium hypochlorite to be used as the starting material. A suitable conventional method may be employed. For instance, a method of reacting an aqueous calcium hydroxide solution with chlorine gas may effectively be used for the process of the present invention. The crystallization velocity is preferably from 50 to 300 kg/m$^3$.hr.

Calcium hypochlorite thus obtained may be separated from the mother liquor by a proper method such as centrifugal separation.

The separated mother liquor obtained in the present invention may be combined with calcium hydroxide and, if necessary, water to form a slurry, which is then reacted with chlorine in the conventional manner to precipitate a basic calcium hypochlorite. Such precipitates may be used as the starting materials of the present invention. Further, a part or whole of the mother liquor separated from such precipitates may be reacted with an inorganic acid so that the remaining acid concentration will be from 0.3 to 1N, whereby chlorine gas is generated and an aqueous calcium chloride solution is obtained. If the remaining acid concentration is less than the above mentioned range, products other than the desired reaction product are likely to form and the recovery efficiency of chlorine tends to be low. On the other hand, if the remaining acid concentration exceeds the above mentioned range, the amount of the acid increases unnecessarily and accordingly a greater amount of an alkali will be required for neutralization of the waste liquid, such being undesirable.

Now, the present invention will be described in further detail with reference to Examples.

EXAMPLE 1

While adjusting the pH at 9.4 to maintain the chlorination rate at 97%, 60 kg/hr of a basic calcium hypochlorite slurry (solid content: 25% by weight) and 2.1 Nm$^3$/hr of chlorine gas were continiously supplied to a reactor, and calcium hypochlorite hydrate was prepared while maintaining the temperature at 40° C.

The crystallization velocity of calcium hypochlorite was 100 kg/m$^3$.hr.

The slurry thereby obtained had a solid content of about 19% by weight, and it was continuously withdrawn from the reactor at a rate of about 67 kg/m$^3$.hr. The slurry was subjected to centrifugal separation, whereby the solid-liquid separation was readily conducted. The solid particles thereby obtained had an average particle size of about 200 μm, and were found by the analysis to be calcium hypochlorite hydrate having a purity of about 97%. On the other hand, the separated liquid contained 15% by weight of calcium chloride. To such a mother liquor, about 15 kg/hr of slaked lime was added to obtain a slurry having a solid content of about 22% by weight. To this slurry about 1.8 Nm$^3$/hr of chlorine gas was blown in at a temperature of 40° C. for chlorination, whereby a basic calcium hypochlorite hydrate slurry was prepared. The crystallization velocity at that time was 150 kg/m$^3$.hr. The slurry thereby obtained was subjected to centrifugal separation. About 15 kg/hr of the basic calcium hypochlorite obtained as solid from the solid-liquid separation, was recycled as the starting material for calcium hypochlorite. On the other hand, 0.035 m$^3$/hr of the separated mother liquor was introduced into a reactor which was maintained at an acid concentration of 0.5N with hydrochloric acid, whereby about 1Nm$^3$/hr of chlorine gas was generated. The chlorine gas thus obtained was recycled to the process for the preparation of calcium hypochlorite.

EXAMPLES 2 to 4 and COMPARATIVE EXAMPLES 1 to 3:

The production of calcium hypochlorite hydrate was conducted in the same manner as in Example 1 except that the operation conditions were varied as identified in Table 1.

The results thereby obtained are show in Table 1.

TABLE 1

| | Example | | | Comparative Example | | |
|---|---|---|---|---|---|---|
| | 2 | 3 | 4 | 1 | 2 | 3 |
| Operation Conditions | | | | | | |
| 1. Calcium hypochlorite slurry supplied | | | | | | |
| Solid content concentration (% by weight) | 25 | 25 | 25 | 25 | 25 | 25 |
| Supply rate (kg/hr) | 19 | 72 | 90 | 60 | 66 | 150 |
| 2. The amount of chlorine gas supplied (Nm$^3$/hr) | 0.6 | 2.5 | 3.1 | 2.1 | 2.1 | 5.2 |
| 3. Reaction condition | | | | | | |
| pH | 9.5 | 9.45 | 9.4 | 9.6 | 9.6 | 9.4 |
| Temperature (°C.) | 40 | 30 | 40 | 15 | 40 | 40 |
| Chlorination rate (%) | 93 | 97 | 97 | 97 | 88 | 97 |
| Crystallization velocity of calcium hypochlorite | 30 | 120 | 150 | 100 | 100 | 250 |

TABLE 1-continued

|  | Example | | | Comparative Example | | |
| --- | --- | --- | --- | --- | --- | --- |
|  | 2 | 3 | 4 | 1 | 2 | 3 |
| hydrate (kg/m³ · hr) |  |  |  |  |  |  |
| Results |  |  |  |  |  |  |
| 1. Average particle size of calcium hypochlorite hydrate (μm) | 250 | 150 | 100 | 20 | * | 30 |
| 2. Slurry concentration in the reactor (% by weight) | 18 | 19 | 19 | 19 | * | 19 |
| 3. Calcium chloride concentration in the separated mother liquor (% by weight) | 14 | 15 | 15 | 15 | * | 15 |
| 4. Filtrability of crystals | excellent | good | fair | poor | * | poor |

*The reaction system became so viscous that the reaction could not be continued.

We claim:

1. A process for producing calcium hypochlorite hydrate crystals, which comprises continuously supplying basic calcium hypochlorite slurry and chlorine gas to a reactor, and reacting them at a temperature of from 20° to 50° C. under a condition that a chlorination rate is maintained from 92 to 98.5% and a crystallization velocity of calcium hypochlorite hydrate crystals in the reactor is controlled to be not greater than 200 kg/m³.hr.

2. The process according to claim 1, wherein the slurry concentration in the reaction system is maintained at from 5 to 30% by weight during the reaction.

3. The process according to claim 1, wherein the chlorination rate is from 96 to 98%.

4. The process according to claim 1, wherein the reaction system is maintained at a pH of from 9.0 to 9.8 at a temperature of about 40° C.

5. The process according to claim 4, wherein the pH is from 9.1 to 9.5.

6. The process according to claim 1, wherein the temperature of the reaction system is from 30° to 40° C.

7. The process according to claim 1, wherein the crystallization velocity is at least 5 kg/m³.hr.

8. The process according to claim 1, wherein the crystallization velocity is from 30 to 150 kg/m³.hr.

9. The process according to claim 1, wherein the slurry concentration in the reaction system is maintained at from 15 to 25% by weight during the reaction.

10. The process according to claim 1, wherein the concentration of calcium chloride formed by the reaction is maintained at no more than 18% at a temperature of about 40° C.

* * * * *